United States Patent [19]
Jokinen et al.

[11] Patent Number: 5,416,435
[45] Date of Patent: May 16, 1995

[54] TIME MEASUREMENT SYSTEM

[75] Inventors: Harri Jokinen, Hiisi, Finland; Sakari Jorri, Solana Beach, Calif.

[73] Assignee: Nokia Mobile Phones Ltd., Salo, Finland

[21] Appl. No.: 116,028

[22] Filed: Sep. 2, 1993

[30] Foreign Application Priority Data

Sep. 4, 1992 [FI] Finland .................................. 923976

[51] Int. Cl.[6] .................. H03D 13/00; H04Q 7/04
[52] U.S. Cl. ...................................... 327/113; 327/40; 327/45; 327/151; 379/58; 324/601
[58] Field of Search ............... 307/518, 526, 525, 524, 307/523, 271; 328/129.1, 152, 133; 324/76.55, 76.41, 601; 379/58

[56] References Cited

U.S. PATENT DOCUMENTS

| | | | |
|---|---|---|---|
| 3,870,900 | 3/1975 | Malaviya | 328/133 |
| 4,332,981 | 6/1982 | Palombi et al. | 379/61 |
| 4,955,075 | 9/1990 | Anderson | 455/182 |
| 5,008,629 | 4/1991 | Ohba et al. | 307/271 |
| 5,073,973 | 12/1991 | Ylivakeri | 455/76 |
| 5,097,490 | 3/1992 | Hulsing, II et al. | 324/76.55 |
| 5,142,699 | 8/1992 | Sato et al. | 340/825.44 |
| 5,187,471 | 2/1993 | Wagai et al. | 455/343 |

FOREIGN PATENT DOCUMENTS 923976 3/1993 Finland .

Primary Examiner—Timothy P. Callahan
Assistant Examiner—Terry L. Englund
Attorney, Agent, or Firm—Perman & Green

[57] ABSTRACT

A time measurement system for measuring time accurately with an inaccurate clock, in which two clock oscillators are compared and the momentary error of the slower clock oscillator is measured. When the error change rate of the slower clock oscillator is slow enough the fast clock oscillator can be switched off for longer time intervals. With the help of this apparatus and method of operation power can be saved in portable equipment which requires accurate time measurement.

9 Claims, 2 Drawing Sheets

TIME MEASUREMENT SYSTEM

FIELD OF INVENTION

This invention relates to a time measurement system and in particular to an apparatus for and a method of producing pulses utilising both a relatively high frequency clock signal and a relatively low frequency clock signal.

BACKGROUND TO INVENTION

In radio telephone systems, for example in the CD500 GSM (Group Speciale Mobile) terminal (i.e. radio telephone), the required clock accuracy is 0.1–0.5 ppm (parts per million). A typical prior art radio telephone system which has such a clock accuracy is described with reference to the accompanying FIG. 1.

FIG. 1 describes a prior art solution for accurate time measurement. The solution involves a fast clock oscillator 1 and a counter 2. The fast clock oscillator 1 is in use continuously and the oscillator pulses are measured by the counter 2. To reach the required accuracy it is required to have an Automatic Frequency Control (AFC) function based on the reference of the signal transmitted by the system (i.e. transmitted by the base station).

Both the clock oscillator 1 and the counter 2 consume a considerable amount of current at high frequencies.

SUMMARY OF THE INVENTION

At least some of the foregoing problems and drawbacks are addressed by the following invention a first aspect of which provides an apparatus for producing pulses comprising a first clock oscillator for outputting a relatively high frequency signal and a second clock oscillator for outputting a relatively low frequency signal, an error calibrating means for measuring a deviation of the relatively low frequency signal from a predetermined frequency, and control means for selectively coupling the relatively high frequency signal and the relatively low frequency signal to a counter means for outputting said pulses, wherein the control means couples the relatively high frequency signal to the counter means for a time period dependant upon the deviation of the relatively low frequency signal from the predetermined frequency and controls the counter means according to the signal coupled thereto.

According to a second aspect of the present invention there is provided a method of producing pulses wherein a relatively high frequency signal and a relatively low frequency signal output from a first clock oscillator and a second clock oscillator respectively are compared for detecting a deviation of the relatively low frequency signal from a predetermined frequency and selectively coupled to a counter means for respective time periods dependant upon the deviation of the relatively low frequency signal from the predetermined frequency, and wherein the counter means is controlled according to the signal coupled thereto.

The apparatus and method have the advantage that they facilitate accurate time measurement and reduce power consumption in an apparatus since the fast clock is not activated all the time.

In a preferred embodiment of the invention the relatively low frequency signal is coupled to the counter means for a predetermined number of cycles.

This has the advantage that less computation is needed to set the time period for which the relatively high frequency signal will be coupled to the counter as all that is required is to compensate for any drift or error in the relatively low frequency signal.

Embodiments of the invention will now be described in more detail, by way of example only, and with reference to the accompanying drawings.

Figure 1:
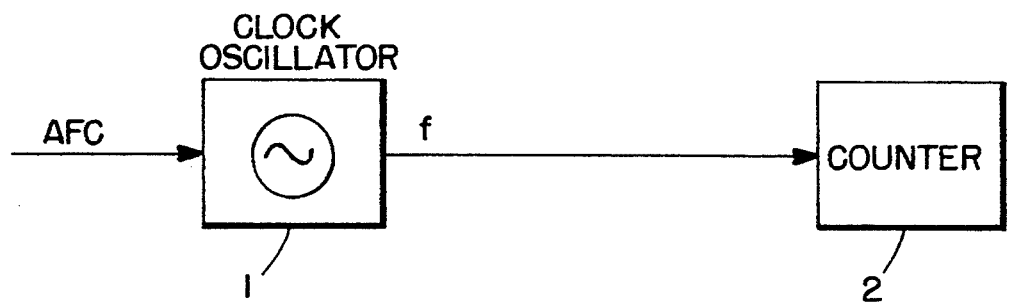
FIG. 1 depicts a prior art solution for accurate time measurement.

FIG. 1 has been described above. The solution in accordance with the invention is described below with reference to FIGS. 2–4, which present an embodiment of the present invention.

Figure 2:
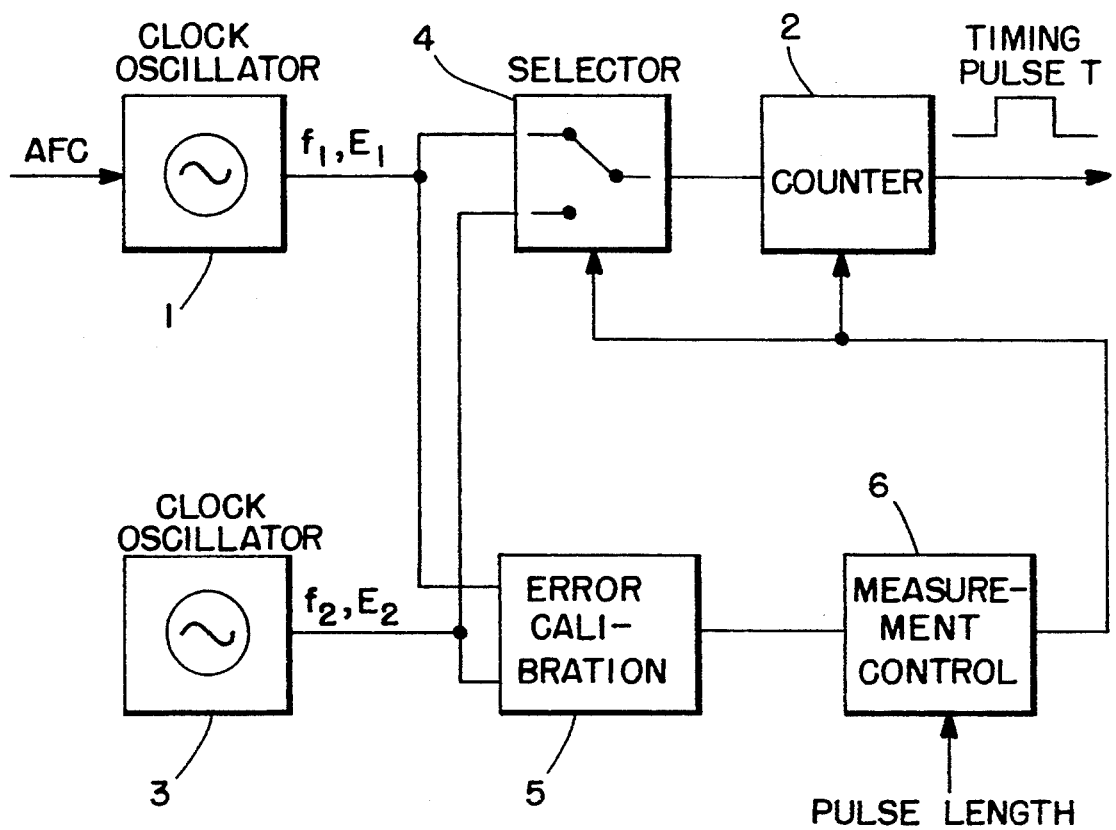
FIG. 2 describes a solution for accurate time measurement in accordance with the present invention.

The diagram shown in FIG. 2 describes a means of accurate time measurement in accordance with the present invention. The means comprises two separate clock oscillators, a faster clock oscillator 1 and a slower clock oscillator 3. A selector 4 selects which of the clock oscillators 1, 3 is to be coupled to the counter 2.

The output pulses of the clock oscillators 1, 3 are compared in an error calibration block 5 and functioning of the counter 2 and the selector 4 is controlled by a measurement control block 6.

Figure 3:
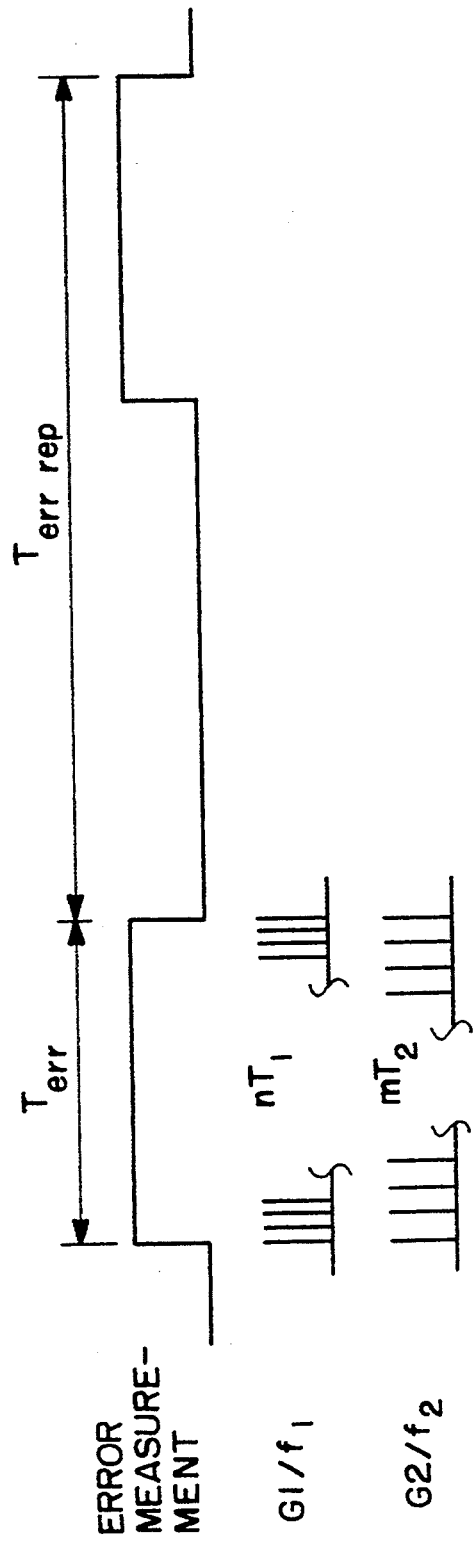
FIG. 3 presents an error calibration pulse diagram in accordance with the present invention.

FIG. 3 shows an error calibration pulse diagram in accordance with the present invention. With the help of the method of the present invention, the accuracy of the clock oscillator 1 is transferred to be the momentary accuracy of the clock oscillator 3 by comparing the output pulses of the clock oscillators 1, 3 in the error calibration block 5.

The number of pulses generated by the clock oscillators 1, 3 during a time interval $T_{err}$ is calculated as follows:

$$T_{err} = n*(1/f_1) - nT_1 = m*(1/f_2) = mT_2$$

This results in:

$$T_1 = m*T_2/n$$

The error calibration is repeated after certain time intervals $T_{err\ rep}$. The calibration is carried out by measuring how much the internal clock oscillator 3 of the phone deviates from the synchronized signal sent by the base station due to the frequency error between clock oscillator 3 and clock oscillator 1. If the phone detects a timing error D during the time period n*T, the pulse period $T_2$ of the clock oscillator 3 has changed by D/n.

Figure 4:
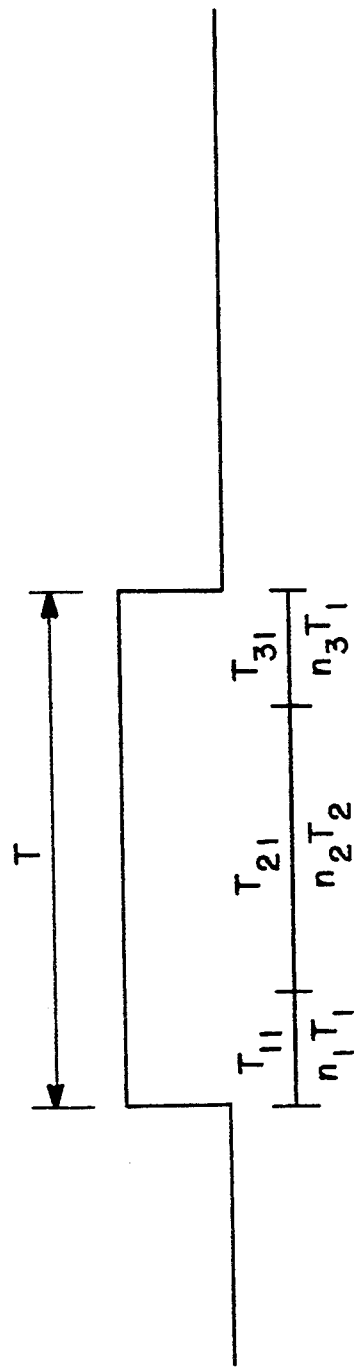
FIG. 4 presents a measurement control pulse diagram in accordance with the present invention.

FIG. 4 shows a measurement control pulse diagram in accordance with the present invention. The functioning of the selector 4 is controlled by the measurement control block 6. The selector 4 selects which of the clock oscillators 1, 3 is to be coupled to the counter 2.

The time interval T is measured in three parts $n_1$ pulses with clock frequency $f_1$ $T_{11}$
$n_2$ pulses with clock frequency $f_2$ $T_{21}$
$n_3$ pulses with clock frequency $f_1$ $T_{31}$ The counter 2 transmits pulses having the length of the time interval T.

During the time interval $T_{21}$ the fast clock oscillator 1 is switched off to save power.

With the help of the method in accordance with the present invention time can be measured accurately by transferring the accuracy of the fast and accurate clock oscillator 1 to the lower and less accurate clock oscillator 3. The accuracy transfer is carried out by comparing the two clock oscillators 1, 3 and by measuring the momentary error of the slower clock oscillator 3. If the error change rate of the slower clock oscillator 3 is slow compared to the time needed for measurement or calibration, the faster clock oscillator 1 can be switched off for longer time intervals.

Depending upon the scale of the deviation or error in the frequency generated by the internal clock oscillator 3, the period $T_{21}$ for which clock oscillator 3 is coupled to the counter 2 can be made longer or shorter. Of course, if the deviation is large, approaching an internal clock oscillator 3 cycle, then the period $T_{21}$ will have to be relatively short because a relatively large number of cycles of oscillator 1 will be required. However, if the error is relatively small then $T_{21}$ can be made longer since fewer cycles of the fast clock oscillator 1 would be necessary to compensate for the error in the internal clock oscillator 3 and maintain the accuracy of the output pulses.

Alternatively, the number of cycles of the internal clock oscillator 3 used to produce each pulse from the counter 2 could be made constant. Thus, the only adjustment necessary in the system due to errors in the internal clock oscillator 3 output, is in the number of fast clock oscillator 1 cycles used either side of the time period $T_{21}$ for which the internal clock oscillator 3 is coupled to the counter 2.

The fast and accurate clock oscillator 1 consumes considerably more power than the slower clock oscillator 3. Utilising the present invention power or current can be saved especially in portable equipment which require accurate time measurement.

Apparatus or a method in accordance with the foregoing can be used to save power in portable cellular phones. The invention is suitable for systems where the phone switches to a power saving mode at certain time intervals, but where time has to be measured accurately. Such systems include for example GSM-, DCS-1800-, JDC- and ADC-systems which operate in a discontinuous receive mode (DRX).

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom. What we claim is:

What we claim is:

1. An apparatus for producing pulses comprising;
   i) a first signal source for outputting a relatively high frequency signal ($f_1$) and a second signal source for outputting a relatively low frequency signal ($f_2$);
   ii) an error calibrating means for measuring a frequency deviation of said relatively low frequency signal ($f_2$) by periodically comparing said relatively low frequency signal ($f_2$) with said relatively high frequency signal ($f_1$); and
   iii) control means for selectively coupling said relatively high frequency signal ($f_1$) and said relatively low frequency signal ($f_2$) as inputs to a counter means to control outputting of said pulses, said control means (6) coupling said relatively high frequency signal to said counter means for a time period dependent upon a deviation of said relatively low frequency signal ($f_2$) from said relatively high frequency signal ($f_1$) as determined by said error calibrating means.

2. An apparatus as set forth in claim 1, wherein said relatively low frequency signal ($f_2$) is coupled to said counter means for a predetermined number of cycles of said relatively low frequency signal ($f_2$).

3. An apparatus as set forth in claim 1, wherein said relatively low frequency signal ($f_2$) is compared with said relatively high frequency signal ($f_1$) for a time period $T_{err}$ such that $T_{err} = n/f_1 = m/f_2$ where n and m are the number of cycles of said relatively high and relatively low frequency signals ($f_1$, $f_2$) respectively.

4. An apparatus as set forth in claim 3, wherein $T_{err}$ is a minimum time period for measuring the deviation.

5. An apparatus as set forth in claim 1, wherein said first signal source is controlled by an applied Automatic Frequency Control (AFC) signal.

6. An apparatus as set forth in claim 1, wherein said pulses output from said counter means have a time period T derived from said relatively high frequency signal ($f_1$) being respectively coupled to said counter means for time periods $T_{11}$ and $T_{31}$ at one or other end of the time period T and said relatively low frequency signal ($f_2$) being coupled to said counter means (2) for a time period $T_{21}$ such that a pulse width $T = T_{11} + T_{21} + T_{31}$.

7. An apparatus as set forth in claim 1, wherein to conserve power, said first signal source is turned off when not required by said counter means or said error calibrating means.

8. An apparatus as set forth in claim 6, wherein said first signal source is turned off during the time interval $T_{21}$.

9. An apparatus as set forth in claim 5, wherein said AFC signal is derivable from a signal transmitted by a base station of a radio telephone network.

* * * * *